March 28, 1961  J. Q. GLEASON  2,977,171
CIGAR BOX ASSEMBLY
Filed June 26, 1957

INVENTOR:
JACK Q. GLEASON
BY:
ATTORNEY.

United States Patent Office 2,977,171
Patented Mar. 28, 1961

2,977,171

CIGAR BOX ASSEMBLY

Jack Q. Gleason, 104 Connally St., College Park, Ga.

Filed June 26, 1957, Ser. No. 668,253

3 Claims. (Cl. 312—31)

This invention relates to cigar box assemblies, and is particularly concerned with the design, construction, and use of cigar box assemblies for storage, shipment and dispensing of cigars in a manner avoiding deterioration of either the appearance or quality of the cigars over a long period of time.

In the packaging, storing and distribution of cigars, there has always been the problem of maintaining the cigars in their original state of color, moisture content, and flavor while providing convenient and economical packaging. This problem has been so difficult to satisfactorily resolve that, in some instances, manufacturers and distributors have resorted to individual glass containers for each cigar and have hermetically sealed the cigars in such containers. Obviously, while such procedure may be effective and efficient, it cannot meet the demands of economic merchandising.

A more common and economical expedient has been the individual enveloping of cigars in sealed transparent envelopes of synthetic material such as cellophane. Although this practice is widespread and has materially enhanced the keeping qualities of cigars, there is danger of incomplete sealing of such envelopes. Furthermore, since the sealing quality and flexibility of cellophane deteriorates with age and exposure, the preservation of the cigars in their original condtion is of limited duration.

Other problems which have confronted the trade, concern the maintenance of an appropriate humidity within cigar boxes and the provision of convenient and accessible means for the display and distribution of cigars of a lower level in a box containing multiple tiers of cigars.

In the present invention, applicant has sought to overcome the above and like problems by the provision of an external packaging box of generally conventional form and material, fully lined with a protective layer of cellophane or like synthetic and preferably transparent plastic material which will act to inhibit the absorption of moisture by the conventional wood or cardboard material of the box. The invention further provides individual trays which may be removably inserted into the box and which are fully encased in an impervious, transparent protective material so as to preclude the absorption of moisture by the material of the trays. By this arrangement the upper tray, when emptied, may be lifted out and replaced by the lower full tray to present cigars in readily accessible position to the customer. In an alternative form of the invention, the upper tray may be hinged so as to provide easy access to the lower tray which, in such instance, may stay in its lower position while the cigars are removed therefrom to be placed in the upper accessible tray. In both forms of the invention the box is pierced to effect ventilation from the outside, and the bottoms of the trays are also pierced to allow ventilation between trays. An important feature of the invention is the perforation of the tray material beneath the transparent protective enclosure thereof so that light may be admitted between the trays to assist in maintaining the original color of the cigars.

A further important feature of the invention is the combination, with the fully sealed box and the fully sealed trays, of humidifier means preferably in the size and general shape of a cigar. The humidifier means is herein embodied as a rigid block of highly absorbent material which may be soaked in humidifying liquid and located in the box in lieu of one cigar in one or both of the trays, so as to permanently maintain a moisture content within the box for the optimum preservation of the cigars.

From the foregoing it will be seen that it is among the more general objects of the present invention to provide a novel and improved cigar box assembly for the packing, storage, transportation and distribution of cigars in a manner to preserve the original character thereof.

Another object of the present invention is to provide an assembly of the character set forth in which the material of the box and/or shelves is precluded from absorbing moisture from the contents, and thus the atmosphere of the box may be maintained in optimum condition over long periods of time.

A further object of the invention is to provide a novel tray for the cigar boxes in which the material of the tray is sealed within a moisture impervious exterior lining so as to preclude absorption of moisture by the material of the body of the tray.

It is also an object of the invention to provide a cigar box in which removable trays may be substituted one for another to maintain a row of cigars in readily accessible position and in which perforations are provided through the trays so as to admit light therebetween.

An additional important object of the invention is the combination, with a container for cigars which is sealed to prevent absorption of moisture by the material of the container, of a humidifying device which will maintain a desired moisture content in the atmosphere within the container over a long period of time.

The objects of the present invention also include that of providing a cigar box having a hinged upper tray which may be retained in an accessible position at the mouth of the box, but which may be pivotally moved to allow access to cigars thereunder by which such cigars may be removed to replenish cigars withdrawn from the hinged tray.

Numerous other objects, features and advantages of the present invention will be apparent from a consideration of the following specification taken in conjunction with the accompanying drawing, in which.

Figures 1, 2, 3, 4, 5:
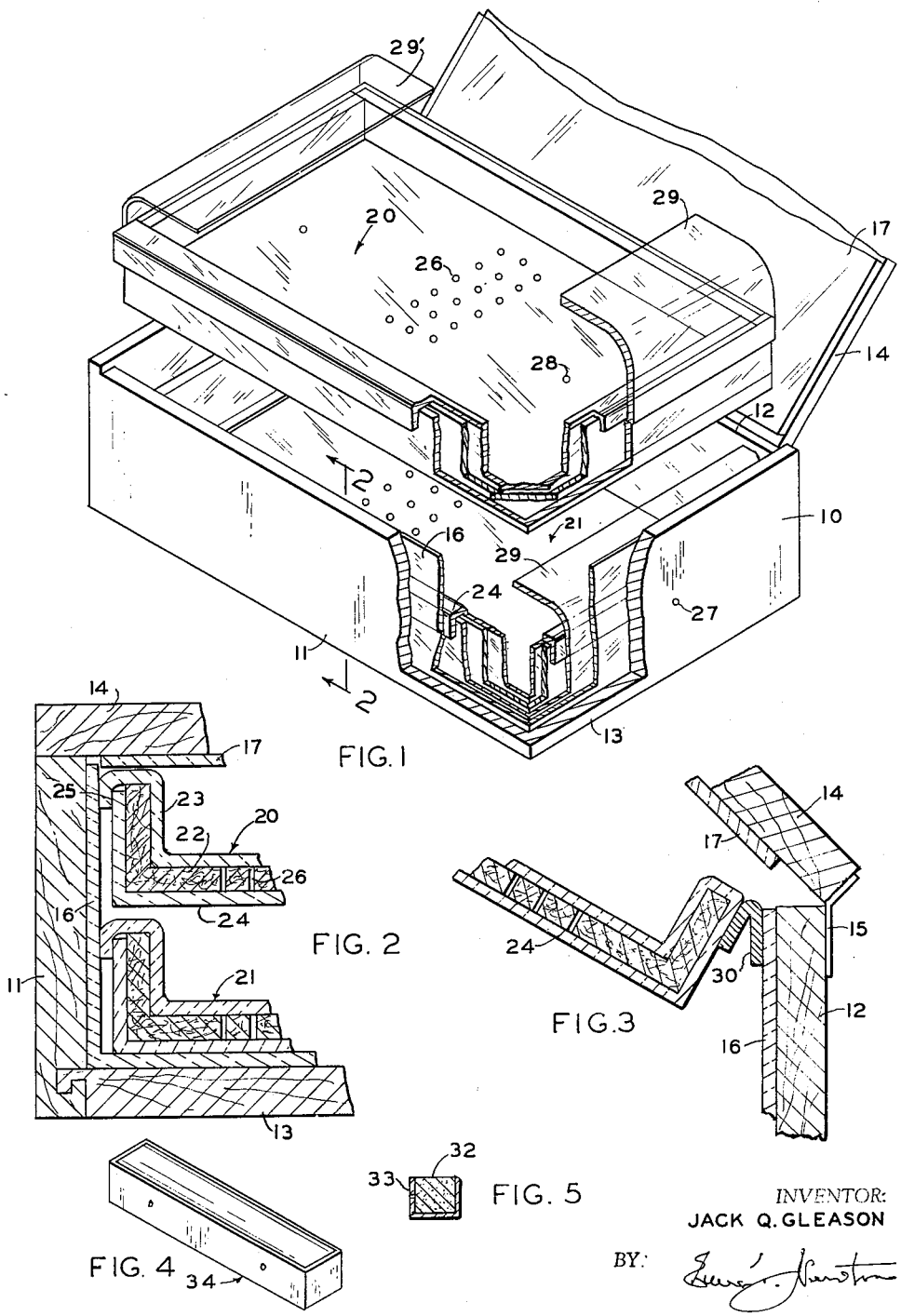
Fig. 1 is a perspective view partially broken away showing a box and trays of the present invention.
Fig. 2 is a detail cross sectional view taken on the line 2—2 of Fig. 1.
Fig. 3 is a detail view showing the hinged mounting for the upper tray of the box.
Fig. 4 is a perspective view of the humidifying device to be used in combination with the box.
Fig. 5 is a cross sectional view through that form of the humidifier shown in Fig. 4.

Referring now more particularly to the drawings, the cigar box shown therein is of generally conventional size and shape including end members 10, front and rear walls 11 and 12, respectively, a hinged lid 14 and a bottom 13. The lid 14 may be hingedly secured along the longitudinal top edge of the rear wall 12 by a paper or cloth binder such as indicated at 15 in Fig. 3.

Whereas in the present form of the invention the box may be considered as formed of the conventional thin cedar wood, glued or otherwise secured at the abutting edges of the ends, front, rear and bottom, it will, of course, be understood that the invention is not particularly concerned with the material employed. Thus, for instance, the material of the box may be of paper board, cardboard, or various like materials. It will be recognized, however, that such materials as will meet the demands of economic manufacture are generally hygroscopic, having a tendency to absorb moisture from the cigars placed therein.

Since these materials are highly absorptive, the present invention seeks to preclude such action by the material of the walls, ends and bottom of the box by providing a continuous inner liner therefor as indicated at 16. Although such lining could be of various impervious sheet materials, such as metal foils and various waterproof types of paper, applicant prefers and here contemplates the use of cellophane or a similar transparent or transluscent, impervious and yet inexpensive, sheet material. This material 16 is preferably formed as a single sheet across the bottom of the box and extends upwardly against the walls and ends to the upper edges thereof. While the liner 16 may be preformed as a removable liner inserted within the box, it is preferable that the liner be directly glued or otherwise secured to the walls and/or bottom of the container. This arrangement is such as to provide a complete, impervious lining for the otherwise absorbent material of the box. In addition, the lid 14 is provided with a sheet 17 of similar lining material, the edges of which are indented to meet the upper edges of the liner 16.

Whereas conventional practice has usually provided for the location of the cigars within the box in superposed layers usually without separating means therebetween, the present invention provides individual upper and lower trays 20 and 21, respectively, each of which comprises a tray body formed with a bottom wall 22 and vertical side walls 23, the material of which may be paper board, cardboard, wood or like material. In order to preclude the absorption of moisture by this body material, the trays are fully enclosed within a transparent, water, impervious cellophane sheet 24 which extends over the side walls and across the upper and lower bottom surfaces to be sealingly engaged with itself as at 25. Thus, each tray is fully enclosed within its cellophane protector.

As clearly shown in both Figs. 1 and 2, the trays have external dimensions and configurations of the box so that they may be readily inserted and removed. Since the trays are uniform, it will be seen that when the upper tray becomes emptied, it may be displaced by a full lower tray; or, the tray may be lifted out and cigars taken from the lower tray for deposit in the upper tray in a convenient position for dispensing.

It has been found that superior preservation of appearance and flavor of the cigars may be maintained not only by precluding loss of moisture, but also by allowing a restricted amount of light to penetrate to the cigars whereby original coloring is maintained. Therefore, the central area of the bottom 22 of the trays is provided with multiple apertures 26 which are covered above and below by the cellophane protective sheet 24. Since the cellophane is transparent, light may filter from the upper tray through the apertures 26 to the lower tray where its beneficial properties will be exerted and the color of the cigars will be retained. Although it is desirable to preclude undue air circulation within the box, it is nevertheless advantageous that restricted ventilation be provided. Therefore, the ends of the box have perforations, as at 27, which extend through the cellophane lining to permit breathing of the environmental atmosphere. Similarly, the trays are provided at either end with through apertures as at 28, which penetrate the cellophane as well as the bottom of the tray and permit the restricted passage of air.

For assisting in lifting the trays out of the box, they may be provided with flaps 29 and 29' which are extensions of the external side wall liners. These flaps normally lie over the cigars in the trays, but are free to be lifted to raise the trays from the box.

As indicated in Fig. 3 of the drawings, it may in some instances be desirable to provide permanent attachment of the upper tray in its position in the box. For this purpose a flexible paper or fabric strap 30 is provided joining the longitudinal upper edge of one wall of the tray with the inner longitudinal upper edge of the back of the box. With this construction, when the upper tray is depleted, it may be hingedly raised to provide access to the cigars therebelow which may be removed for placing in the upper tray.

Although the construction above described provides for a retention of natural moisture in cigars over a long period of time and acts to inhibit the absorption of moisture by the material of the trays and box, it has been found that an even longer satisfactory preservation of the texture and quality of cigars may be achieved by the use of a humidifier. While it is recognized that humidifiers have long been used in various manners in the storing of tobacco products, it has been found that a humidifier when used in combination with the cellophane sealing above referred to will materially enhance the preservation of quality of the cigars. The humidifier of the present invention is illustrated in Figs. 4 and 5 and comprises a cake or block of absorptive material 32 which, while generally rectangular, is preferably of the length and cross section of a cigar so that it may rest in the space otherwise taken by a cigar. One preferred form of the humidifier adapted for combination with the present box and tray here shown is formed with one part sand and two parts plaster of Paris. Upon the mixing of this composition with water to form a paste, the same is deposited in a rectangular open topped foil box or tray 33, generally conforming in length and maximum cross section with a cigar. Thus the humidifier 34 resulting therefrom be placed in parallel relation with cigars of either tray. It will be undertsood that, as desired, a plurality of such humidifiers may be used in the cellophane lined container to maintain the desired humidity therein. Should the humidifier become too dry for continued maintenance of the desired humidity, the same may be placed in water to be recharged. When the humidifier is thoroughly saturated as indicated by the termination of air bubbles which would otherwise rise therefrom, it may be replaced with the cigars and, operating in combination with the sealing effect of the cellophane, will continue to maintain the cigars in the desired condition.

In the practice of the invention, numerous changes, modifications and the full use of equivalents may be resorted to without departure from the spirit or scope of the invention as defined in the appended claims.

I claim:

1. A cigar box assembly including a box of relatively absorbent material, a cover for said box, a cellophane lining in said box, there being provided a hole in the end of said box through said cellophane to allow for air circulation, a first tray for said box and being formed of relatively absorbent material, an impervious covering for said first tray, said first tray having light transmitting apertures therethrough, said first tray having apertures through said covering and said absorbent material to allow for ventilation in said box, a second tray supported by said box within said box and providing support for said first tray, said second tray being formed of relatively absorbent material, and a covering for said second tray, said first and second trays being interchangeable with each other within said box.

2. A cigar box assembly including a box of relatively absorbent material, a cover hingedly connected to said box, a lining in said box, there being provided a hole in the end of said box through said cellophane to allow for air circulation, a first tray for said box formed of relatively absorbent material, an impervious covering for said tray, said first tray having light transmitting apertures therethrough, said first tray having apertures through said covering and said absorbent material to allow for ventilation in said box, said first tray being hinged at substantially the same side as said cover, and a second tray below said first tray supported by said box and providing support for said first tray.

3. A cigar box assembly including a box of relatively absorbent material, a moisture resistant lining for said box, a first tray for said box formed of relatively moisture absorbent material, a second tray below said first tray within said box and supported by said box, said second tray supporting said first tray, said second tray being formed of relatively moisture absorbent material, and a moisture resistant covering for each tray, together with a hinged connection between said first tray and said box.

References Cited in the file of this patent

UNITED STATES PATENTS

| | | |
|---|---|---|
| 261,642 | Swift | July 25, 1882 |
| 557,043 | Adams | Mar. 24, 1896 |
| 571,945 | Ertheiler | Nov. 24, 1896 |
| 783,541 | Raisler | Feb. 28, 1905 |
| 906,899 | Kronk | Dec. 15, 1908 |
| 1,250,395 | Van Vliet | Dec. 18, 1917 |
| 1,268,163 | Schneider | June 4, 1918 |
| 1,310,949 | Harms | July 22, 1919 |
| 1,488,044 | Harms | Mar. 25, 1924 |
| 1,732,214 | Amez-Droz | Oct. 22, 1929 |
| 1,871,418 | McKee | Aug. 9, 1932 |
| 1,940,190 | Shoffer | Dec. 19, 1933 |
| 2,239,398 | Palmer | Apr. 22, 1941 |
| 2,241,710 | Lowey | May 13, 1941 |
| 2,276,217 | Lee | Mar. 10, 1942 |
| 2,287,495 | Moyers | June 23, 1942 |
| 2,570,105 | Fryda | Oct. 2, 1951 |
| 2,570,958 | Lee | Oct. 9, 1951 |
| 2,692,696 | Yaeger | Oct. 26, 1954 |
| 2,808,192 | Raisin | Oct. 1, 1957 |

FOREIGN PATENTS

| | | |
|---|---|---|
| 528,545 | Great Britain | Oct. 31, 1940 |